US009877615B2

(12) United States Patent
Ahmes et al.

(10) Patent No.: US 9,877,615 B2
(45) Date of Patent: Jan. 30, 2018

(54) BATHTUB FITTING STANDARD EXTERNAL SPACE WHILE AFFORDING SAFE EGRESS AND LARGER FLOOR AREA WITH ENCLOSED VOLUME

(71) Applicant: BRAK TUB CORP., Brightwaters, NY (US)

(72) Inventors: Bruce Ahmes, St. James, NY (US); Ryan Ahmes, Brightwaters, NY (US); Kenneth Piccininni, Hauppauge, NY (US)

(73) Assignee: BRAK TUB CORP., Brightwaters, NY (US)

( * ) Notice: Subject to any disclaimer, the term of this patent is extended or adjusted under 35 U.S.C. 154(b) by 23 days.

(21) Appl. No.: 15/201,448

(22) Filed: Jul. 2, 2016

(65) Prior Publication Data

US 2017/0020345 A1    Jan. 26, 2017

Related U.S. Application Data

(63) Continuation-in-part of application No. 14/724,380, filed on May 28, 2015, now Pat. No. 9,648,989, (Continued)

(30) Foreign Application Priority Data

Aug. 3, 2015  (CN) .......................... 2015 3 0286765
Sep. 18, 2015 (CA) ....................................... 164498
Jun. 8, 2016  (AU) ................................. 2016100845

(51) Int. Cl.
  *A47K 3/04*   (2006.01)
  *A47K 3/00*   (2006.01)
  (Continued)

(52) U.S. Cl.
  CPC ................ *A47K 3/04* (2013.01); *A47K 3/001* (2013.01); *A47K 3/02* (2013.01); *B29C 39/003* (2013.01);
  (Continued)

(58) Field of Classification Search
  CPC . A47K 3/04; A47K 3/001; A47K 3/02; B29C 39/02; B29C 39/26; B29C 39/003
  (Continued)

(56) References Cited

U.S. PATENT DOCUMENTS 531,710 A    1/1895  Wheeler
D25,896 S    8/1896  Arrott
  (Continued)

FOREIGN PATENT DOCUMENTS

JP         2012228406 A   11/2012

*Primary Examiner* — Tuan N Nguyen
(74) *Attorney, Agent, or Firm* — Alfred M. Walker

(57) ABSTRACT

A method of making a bathtub providing safe egress by reducing slide forces extended on a user's feet upon a slippery bathtub floor, wherein the formed bathtub has a limited rectangular footprint, and an optimized floor space is formed with a substantially planar base with a length and width that define the limited rectangular footprint and a front wall, a back wall, a first side wall and a second side wall integral with and extending substantially vertically upwards from the substantially planar base. Each of the front, back, first side wall and second side wall have minimal wall thicknesses to define the optimized floor space and the front wall has a substantially planar inwardly, cantilevered upper apron deck in a substantially parallel relation to the substantially planar base.

19 Claims, 12 Drawing Sheets

Related U.S. Application Data which is a continuation-in-part of application No. 14/718,662, filed on May 21, 2015, now Pat. No. 9,648,987, which is a continuation-in-part of application No. 14/688,413, filed on Apr. 16, 2015, application No. 15/201,448, which is a continuation-in-part of application No. 29/521,732, filed on Mar. 26, 2015, now Pat. No. Des. 737,416.

(60) Provisional application No. 62/111,453, filed on Feb. 3, 2015.

(51) Int. Cl.
| | | |
|---|---|---|
| *B29C 39/02* | (2006.01) | |
| *B29C 39/00* | (2006.01) | |
| *B29C 39/26* | (2006.01) | |
| *A47K 3/02* | (2006.01) | |
| *B29K 33/04* | (2006.01) | |
| *B29L 31/00* | (2006.01) | |

(52) U.S. Cl.
CPC .............. *B29C 39/02* (2013.01); *B29C 39/26* (2013.01); *B29K 2033/04* (2013.01); *B29L 2031/7692* (2013.01)

(58) Field of Classification Search
USPC ..................................................... 4/584, 585
See application file for complete search history.

(56) References Cited

U.S. PATENT DOCUMENTS

| | | |
|---|---|---|
| D73,911 S | 11/1927 | Henricks |
| 1,811,896 A | 6/1931 | Ross |
| D119,528 S | 3/1940 | Wendland |
| 2,341,475 A | 11/1947 | Gruen |
| 2,841,795 A | 7/1958 | Pelicano |
| D199,781 S | 12/1964 | Clavarino |
| D212,452 S | 10/1968 | DeVane |
| D236,619 S | 9/1975 | Powell |
| 4,099,280 A | 7/1978 | Hoppe et al. |
| D253,368 S | 11/1979 | Johansson |
| 4,316,294 A | 2/1982 | Baldwin |
| D266,947 S | 11/1982 | Topete |
| D279,028 S | 5/1985 | Kohler |
| 5,200,257 A * | 4/1993 | Gatarz ................ B29C 33/0044 4/585 |
| D335,701 S | 5/1993 | Zaccai |
| 5,303,519 A | 4/1994 | Mustee et al. |
| 5,758,369 A | 6/1998 | Takahashi |
| 5,911,943 A | 6/1999 | Minghetti et al. |
| 7,299,509 B1 | 11/2007 | Neidich |
| D577,108 S | 9/2008 | Piatt |
| 7,490,371 B2 | 2/2009 | Torres |
| D600,330 S | 9/2009 | Barba |
| D619,685 S | 7/2010 | Hoernig |
| D633,603 S | 3/2011 | Su |
| D694,865 S | 12/2013 | Licini |
| D697,182 S | 1/2014 | Lutz |
| D709,598 S | 7/2014 | Dupras |
| 9,321,191 B2 | 4/2016 | Doss |
| 2005/0246830 A1 | 11/2005 | Galyean, Jr. et al. |
| 2011/0167728 A1 | 7/2011 | Alelov |

* cited by examiner

BATHTUB FITTING STANDARD EXTERNAL SPACE WHILE AFFORDING SAFE EGRESS AND LARGER FLOOR AREA WITH ENCLOSED VOLUME

RELATED APPLICATIONS

This application is a continuation-in-part of application Ser. No. 14/724,380 filed May 28, 2015. The '380 application is a continuation-in-part of application Ser. No. 14/718,662, filed May 21, 2015 ("the '662 application"), which '662 application is a continuation-in-part of application Ser. No. 14/688,413 filed Apr. 16, 2015, ("the '413 application"). The '380, '662 and '413 applications are incorporated by reference herein, and Applicants claim priority in part under 35 USC § 120 therefrom. This application also claims the benefit of provisional patent application No. 62/111,453 filed Feb. 3, 2015 ("the '453 application") under 35 USC § 119(e). The '453 application is incorporated by reference herein.

FIELD OF THE INVENTION

The present invention relates to providing safe egress from wet bathtub floors and to maximizing internal bathtub/shower stall space within predetermined confines of typical residential bathroom space dimensions.

BACKGROUND OF THE INVENTION

Safety studies indicate over 234,000 bathroom injuries each year, of which 81 percent occurred because of falls in the bathroom. See Bakalar, "Watch Your Step While Washing Up", New York Times, Aug. 15, 2011, citing CDC Centers for Disease Control and Prevention, "Nonfatal Bathroom Injuries Among Persons Aged >15 Years, United States, 2008", Morbidity and Mortality Weekly Report (MMWR), 60 (22); 729-733, Jun. 10, 2011. Of these injuries, more than one third happen while bathing or showing. The Center for Disease Controls (CDC) estimates that 9.8 percent of all bathroom injuries specifically occur when getting out of a bathtub, which equals at least 22,932 injuries.

Applicants believe that injuries while getting out of a bathtub occur because of the wide straddling of the bather's legs when exiting a bathtub. The horizontal component force Fs that arises from this prior art arrangement is 0.306 W or almost 31% of the weight of the person. This horizontal component must be resisted by the frictional force between the ball of the anchor foot and the tub (or a tub mat). Several items affect the local coefficient of friction between foot and tub, or foot and mat and mat to tub. Water, and especially soapy water, is a good lubricant and dramatically reduces the coefficient of friction. If the widely straddled anchor foot slips, the bather's weight is subject to horizontal sideways force and prone to dangerous falls while attempting to exit the bathtub.

In addition to the aforementioned safety issues, when viewed in crossection from an end, conventional prior art bathtubs have limited interior bathing space by virtue of the fact that the upper apron deck provided for sliding glass doors is usually three or more inches in top width, which narrows considerably the interior bathing or showering space or volume within the conventional bathtub. Additionally, for symmetry purposes, a similar opposite wall abutting top edge is also typically three or more inches in top width, thereby further limiting the space or volume within the bathtub. While bathtubs are generally four to six feet in length, typical residential bathrooms generally have a limited rectangular footprint area of 60 inches by 30 or 32 inches within which to locate a bathtub and shower installation. So losing 1, 2, 3 or 4 inches in width results in a significant reduction in the overall internal space or volume within a typical bathtub.

Among known prior art patents includes U.S. Pat. No. 2,431,475 of Gruen, which discloses the elimination of a front bathtub apron wall and the creation of an apron effect, by providing a front wall having an upper edge wall fanning outward, both inside the tub and outwards from the front of the tub, to prevent water from splashing out of the bathtub.

US Patent Application 2011/0167728 of Alelov discloses an "Expandable Side Enclosure for Bathtubs/Showers", to provide a solution to prevent arm movement restrictions caused to bathers in bathtubs and/or showers due to the lack of free body and limb movement in baths with standard enclosures. While Alelov provides outwardly extended bay-type windows in the sliding glass doors, which are at standing arm height, to provide more movement of the arms during a shower. However, Alelov does not increase the internal volume of the bathtub itself.

U.S. Pat. No. 1,811,896 of Ross discloses a circular topped truncated conical water basin/bowl/tub with an inwardly inverted anti-splash lip/flange. However, Ross cannot be installed in a typical rectangular bathtub footprint in a residential bathroom.

U.S. Design Pat. No. D619,685 of Hoernig discloses a shower and tub with a "flip up out of the way" apron deck, to expand the interior space of the bathtub. However, Hoernig requires moving parts and hinges, which are complicated and detrimental in a high humidity bathtub environment.

U.S. Design Pat. No. Des. 335,701 of Zaccui discloses a bathtub which increases interior space by having bulging outwardly extending side walls. However, the bulging sides of Zaccui '701 prevents its installation within a standard bathtub area.

U.S. Pat. No. 7,490,371 B2 of Torres describes a shower receptor base pan formed from a one piece mold, but where the sheet molding compound (SMC) is placed in a two piece mold, and formed and cured.

U.S. Pat. No. 5,303,519 , of Mustee describes using a two piece mold to form bathroom shower walls with undercuts to form side wall mounting groove recesses.

These known prior art devices do not maximize internal bathtub/shower stall space within the predetermined confines of typical residential bathroom space dimensions. The use of a small depth apron deck, such as a thin front bathtub wall with straight edges, or optionally with an inwardly extending only cantilevered top apron edge in the present invention for an expanded space bathtub, where the rear wall has no apron edge, would be discouraged, if not clearly taught away from the prior art patents.

Therefore, the use of a bathtub with both a narrow apron deck, such as an inwardly extending apron deck of about 2-3 inches in depth, on a front wall having a top width of about one inch to about two and one half inches in width, together with an expanded footprint and volume for the bathtub, as in Applicants' present invention, in conjunction with the spatial confines of a rectangular bathtub installation area of a residential bathroom, is not only not suggested, but would be discouraged or taught away by the designs known from the conventional arts.

OBJECTS OF THE INVENTION

An object of the present invention is to provide a bathtub which provides safe egress for the bather.

It is also an object of the present invention to minimize falls from bathtubs by providing a structural front wall which minimizes wide straddling of the bathtub front wall by a bather exiting from the wet bathtub.

Another object is to provide a bathtub that fits within standard tub dimensions but has a larger internal floor area and larger volume within. Most bathtubs are used for taking showers but are dimensioned for tub use. The inventive bathtub better accommodates its shower use while still affording the choice of use as a soaking tub. The larger interior floor area of the bathtub simulates the feel of a larger shower by being less confining.

In a preferred embodiment the apron deck is cantilevered from the front vertical surface of the front wall inward and then rejoins the thin front wall at near the top of the rear vertical surface of the front wall, thereby realizing a tub that does not suffer a reduction in the interior floor space by the front deck width. The floor area covered by a projection of the front deck is usable space for visual appearance, as well as actual space for feet while standing and taking a shower. In this preferred embodiment, the inwardly cantilevered apron deck has an undercut, which preferably requires the use of a secondary mold of a two piece mold for forming.

In a non-preferred optional embodiment, the front deck width still is maintained to accommodate sliding door tracks thereon, however, to support sliding glass doors. The side decks and back deck are just the thickness of the tub material. In this alternate embodiment, the front deck is maintained with a width of up to a maximum of 3.5 inches, or preferably between one inch and two and one half inches, according to a width required to accommodate siding door tracks. In one embodiment the apron deck is on top of a wall having the same width, except for an increase of one quarter inch on the bottom.

SUMMARY OF THE INVENTION

The substantially vertical walls and thinness of the front wall of the bathtub of the present invention minimize injuries from falls by providing safe egress from the bathtub, by virtue of the fact that the user has a very small straddling angle measured by the angle of the anchor foot planted in the bathtub, as compared to an imaginary vertical line, when lifting the leading foot over the edge of the bathtub.

As a result, in a preferred embodiment with a cantilevered front apron deck, only a small percentage, such as ten percent, of the bather's weight, is subject to slippery horizontal sliding forces. In another embodiment with an apron deck on top of a front wall with straight surfaces, another small percentage, such as fourteen percent, of the bather's weight is subject to slippery, horizontal sliding forces. This compares to a much larger percentage of weight, such as thirty percent, of the weight of a bather straddling the front wall of the bathtub when the anchor foot planted in the bathtub is far away from the front wall, resulting in a much larger straddling angle, causing substantial horizontal sliding forces of the bather's feet on the slippery bathtub floor, and /or slippery floor outside the bathtub.

The safety egress bathtub encompasses a method of providing and using a safe egress bathtub including the steps of:

a) providing the bathtub with substantially vertical back and front walls, first and second end walls, and a bottom wall, all of these walls being of rigid material, wherein the entry and egress of a bather user is accomplished by stepping over the front wall;

b) providing the front wall with a thin or cantilevered top horizontal apron deck extending from an outer surface of the front wall toward the back wall, wherein the top horizontal apron deck has sufficient width to support sliding shower wall tracks thereon;

c) the bottom floor wall extends to a rear, vertical surface of the front wall with the top apron deck adjacent the rear, vertical surface of the front wall;

d) the user places a first leg on the bottom wall of the bathtub adjacent the vertical front wall of the bathtub, the foot of the leg being generally pointed toward the front wall; and e) the user places a second leg over the front wall for stepping out of the bathtub, wherein the first leg makes with the vertical front wall an angle sufficiently small so as to reduce a horizontal component of force on the foot of the user's first leg, for reducing the incidence of slippage on a wet surface of the bathtub bottom floor.

Additionally, the bathtub of the present invention has with a limited rectangular footprint and an optimized floor space, including:

a substantially planar base with a length and width that define the limited rectangular footprint;

a front wall, a back wall, a first side wall and a second side wall integral with and extending substantially vertically upwards from the substantially planar base;

wherein each of the front, back, first side wall and second side wall have minimal wall thicknesses to define the optimized floor space, and wherein the front wall has a substantially planar cantilevered upper apron deck that extends inwardly from an outer substantially vertical front wall surface for a fixed amount to an inner substantially vertical rear wall surface in a substantially parallel relation to the substantially planar base.

The bathtub's front wall is arranged in opposing relation to the back wall and the first side wall is arranged in opposing relation to the second side wall such that all of the walls are integrally joined to define the inner bathtub volume therebetween.

The bathtub's minimal wall thickness is a minimum thickness to which the walls can be manufactured and maintain structural integrity, wherein the minimal thickness to which the wall can be manufactured is dependent on a material composition of the walls.

The bathtub's substantially planar upper apron deck extends inwardly between and integrally connected to upper portions of the first side wall and the second side wall, in a substantially parallel relation to substantially planar base.

While dimensions may vary, preferably the limited rectangular footprint of the base of the bathtub is approximately 1419 square inches.

The bathtub has a distance between an inner surface of the front and back walls and a distance between an inner surface of the first and second side walls, measured at an upper surface of the substantially planar base and a lower inner surface of the substantially planar upper apron deck, respectively, and a minimal distance between the upper surface of the substantially planar base and the substantially planar upper apron deck, define an inner air volume of the bathtub.

While dimensions may vary, preferably the interior air volume is approximately 20,845 cubic inches.

Preferably the bathtub's thickness of the substantially planar upper apron deck is less than or equal to the thickness of the front wall, and wherein the thickness of the substantially planar upper apron deck is a minimum thickness to which the upper apron deck can be manufactured and maintain structural integrity.

One wall of the first side wall and the second side wall extends vertically at an angle that is greater than 90° between a plane of the base and a plane of the one of the first side wall and the second side wall.

Preferably, the inner corners formed by vertical ends of the first and second side walls of the bathtub, with vertical ends of the front and back walls, are substantially rounded, but having an arc of about one half inch.

Also preferably, the inner corners between lower ends of the first and second side walls and the front and back walls and, an inner surface of the substantially planar base are substantially rounded, but having an arc of about one half inch.

The bathtub's one or more first and second side walls extend inwardly from an outer substantially vertical wall surface of the one or more first and second side walls for a fixed amount, in a substantially parallel relation to the substantially planar base.

Also preferably, when the apron deck is cantilevered, the bathtub's front wall and rear wall each have a thickness of about one inch. When the apron deck is not cantilevered and extends downward in front and rear surface walls to the planar base, the thickness is preferably about two and a half inches, although it can be reduced to about one inch in thickness.

Preferably, the bathtub's front wall and rear wall are tapered, with a top thickness of about one inch and with a bottom thickness of about one and one quarter inch in thickness.

The bathtub also may optionally have hollow interiors, wherein the front wall is hollow, with an outer front wall of about one quarter inch in thickness and an inner front wall of about one quarter inch in thickness, further with a hollow air space therebetween.

The bathtub's rear wall may also optionally have a front rear wall of about one quarter inch in thickness, and a hollow air space of about three quarter inches extending behind the front rear wall up to the surface of the bathroom wall, to accommodate tile and tile grout therebetween.

The cantilevered slanted inward ledge of the apron deck is preferably made of a separate secondary mold, which is attached to the main primary mold for the body of the bathtub. Then the acrylic or other malleable molding material is poured over the two joined molds and the main primary tub mold is inverted, so that the assembled acrylic bathtub will slide downward out of the main primary tub mold. The smaller secondary inward ledge mold is therefore encased within the portion of the tub corresponding to the inwardly extending cantilevered ledge. In the completed acrylic tub, the encased secondary mold piece is slid out laterally from an open end of the tub, within the actual integrally formed cantilevered inward ledge portion of the bathtub. While the bathtub is preferably made with acrylic, it can be made from any malleable material which conforms to complex curves of an analog mold used to form the bathtub.

In the alternate embodiment of this invention, the front of the bathtub is increased in thickness and the cantilevered top apron is not used, so that in that situation, a one piece mold can be used for the assembled bathtub.

BRIEF DESCRIPTION OF THE DRAWINGS

The present invention can best be understood in connection with the accompanying drawings. It is noted that the invention is not limited to the precise embodiments shown in the accompanying drawings, in which.

DETAILED DESCRIPTION OF THE INVENTION

Figure 1:
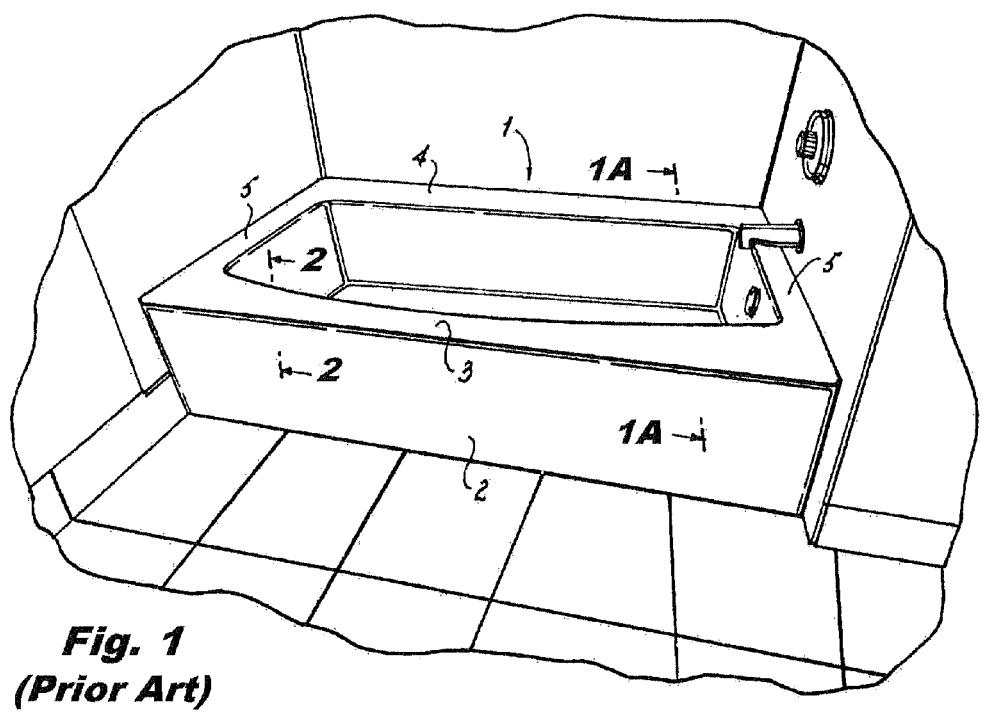
FIG. 1 is a perspective view of a portion of a bathroom enclosing a prior art bathtub.
Figure 2:
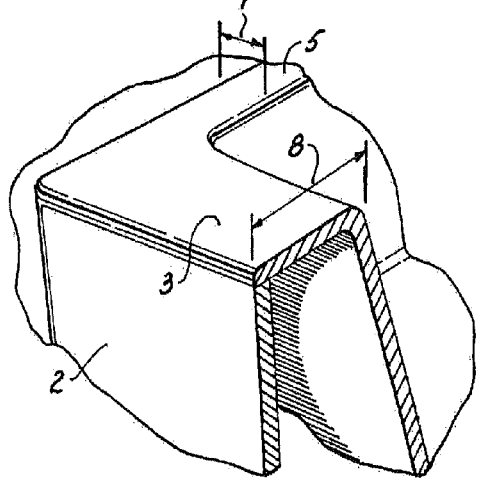
FIG. 2 is a perspective detail in partial crossection of a front corner of the prior art tub showing the front deck width.

As shown in Prior Art drawing FIGS. 1 and 2, the prior art tub 2 in bathroom 1 as shown in FIG. 1 is meant to represent any commonly available design. Front deck 3, back deck 4 and side decks 5 are shown. FIG. 2 is a close-up showing the typical wide dimension 8 of front deck 3 as well as the narrower side decks 5 dimension 7.

Figure 3:
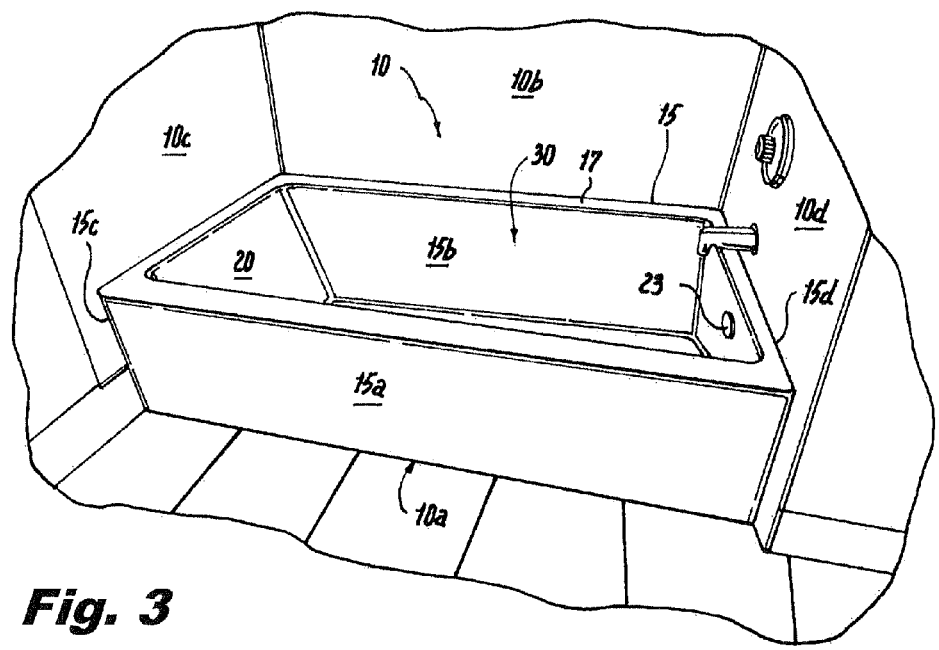
FIG. 3 is perspective view of a portion of a bathroom enclosing the bathtub of this invention.
Figure 4:
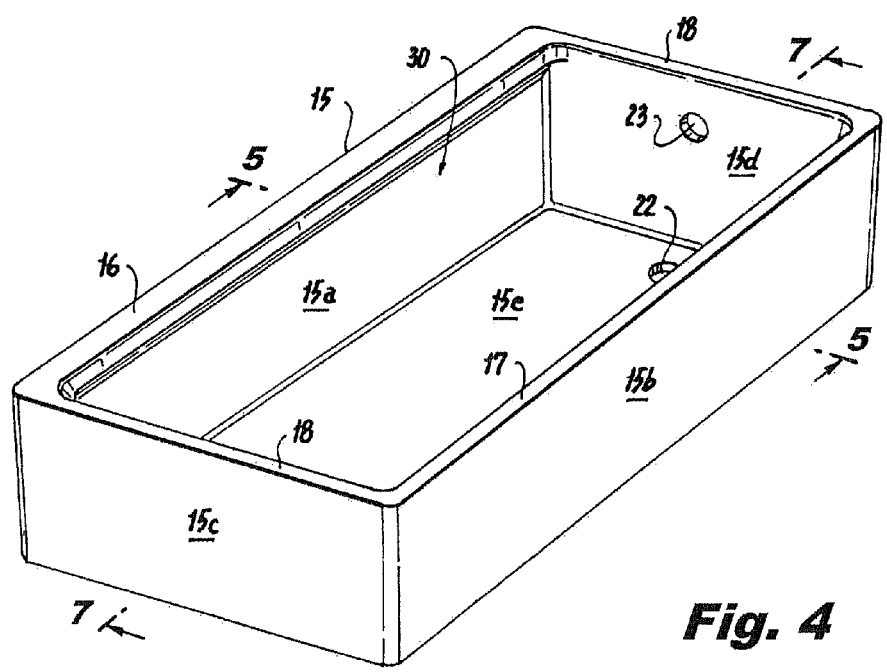
FIG. 4 is a perspective view of the bathtub of this invention.
Figure 5:
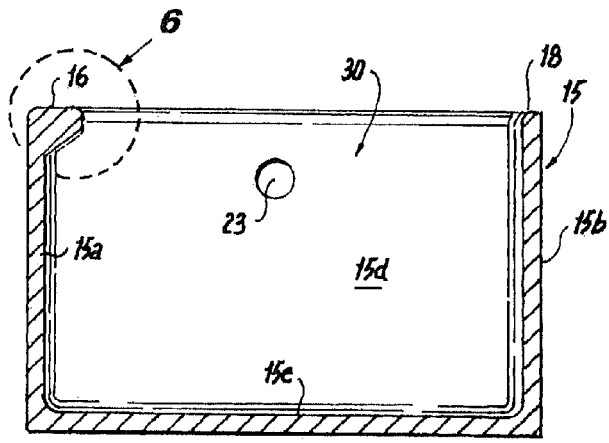
FIG. 5 is an end view crossection showing the profile of the cantilevered front deck.
Figure 6:
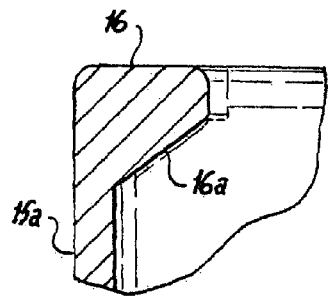
FIG. 6 is an enlarged cross-section detail of the cantilevered front deck.
Figure 5A:
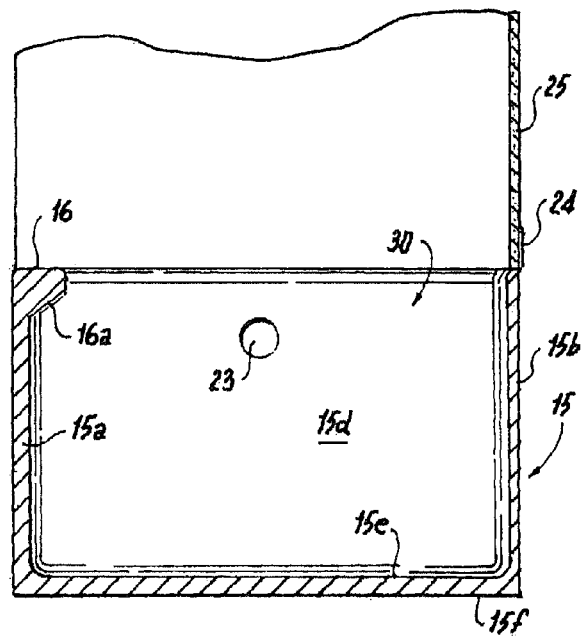
FIG. 5A is an end view crossection of an alternate embodiment, showing the profile of the cantilevered front deck.
Figure 7:
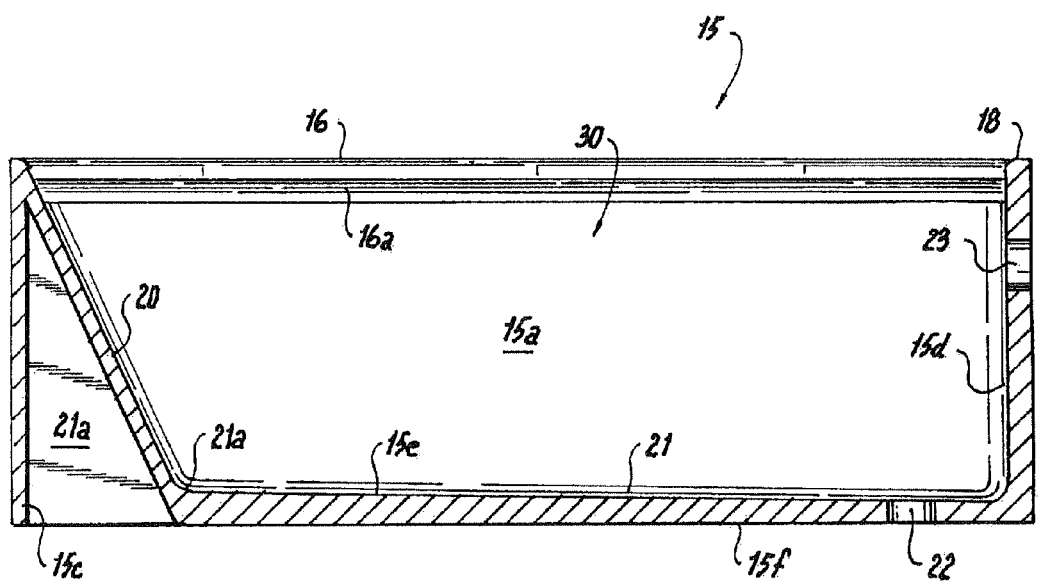
FIG. 7 is a side cross-section view of the bathtub of this invention.

FIGS. 3-9 pertain to one embodiment of the bathtub of this invention. The length of the bathtub can be from four to six feet, the height which could be from fourteen to eighteen inches, and the width which could be from thirty to thirty-six inches. FIG. 3 shows tub 15 in bathroom 10 which is of the same dimensions as bathroom 1 in FIG. 1, which is typically five feet wide (60 inches), thirty inches in front to back depth, and about fourteen inches in height. FIG. 4 shows tub 15 in a perspective view with back deck 17 in the forefront and front deck 16 at the far side. It is noted that side decks 18 as well as back deck 17 have wall widths that are equivalent to the thickness or width of the material comprising the side walls, the back wall and the front wall below the front deck. The crossectional views of FIGS. 5, 5A and 6 show the cantilevered shape of front deck 16 in detail, highlighting that the front deck width does not encumber the interior width of the tub floor. It is further noted that the width dimension 19 is the same as dimension 8 in prior art FIG. 2. FIG. 7 is a length wise crossection showing sloping backrest 20 and slight drain slope 21, which is preferred. In these FIGS. 3-9, large sections are shown as being solid material just for interior dimensional clarity, however they may in fact have enclosed air spaces. This would be especially true of the large wedge shape under back rest 20 and the cantilevered front deck as in FIG. 6; it would depend on the material used and method of construction.

An expanded space bathtub 15 fits in standard tub dimensions of bathroom 10 having footprint floor area 10a and vertically extending bathroom wall surfaces 10b, 10c and 10d, and has a larger internal floor area 15e of bottom base wall 15f, and larger air volume 30 within. The bathtub 15 includes thin walls, including four vertically extending walls, including front wall 15a, rear wall 15b, left side wall 15c with sloping backrest 20 adjacent thereto and separated from left side wall 15c by hollow interior area 21a', and right side wall 15d having trip lever hole 23. Vertical walls 15a, 15b, 15c and 15d extend vertically upward from rectangular bottom base wall 15f having an exterior footprint to fit within the pre-determined rectangular bathtub insertion floor footprint area 10a of bathroom 10. Bottom base wall 15f has an interior footprint 15e, which, with the inside surfaces of vertically extending walls 15a, 15b 15c and sloping backrest wall 20 of left side wall 15c, define the enlarged air volume 30 extending therebetween.

The thickness of the vertical walls 15a, 15b, 15c, 15d and sloping side backrest 20 is preferably one inch in thickness near the top, up to about one and one quarter inches on the bottom, to provide a slightly sloped surface for easy removal of the tub from a mold. The one inch and one and one quarter inch dimensions need not be solid, so that a wall (not shown) having a thickness of one quarter inch on each side can have a hollow interior of one half inch. A similar hollow area can be provided at the slightly wider bottom width of one and one quarter inches total, combined with the walls and hollow interior. Moreover, for the rear, wall facing wall 15b, the wall 15b can be just one layer of one quarter inch in thickness, with a three quarter inch hollow area behind the one quarter inch wall, up to the bathroom wall surface 25 itself. The one inch thickness at the top 17 of rear wall 15b is required to accommodate tiles of up to 5/8 inch in thickness and accompanying grout against the bathroom wall surface 25. As shown in FIG. 5A, an optional attachment flange 24 can be attached to rear wall 15b for attachment to bathroom wall surface 25.

As shown in the crossectional view of FIG. 7, the inside bottom footprint 15e of bottom base wall 15f preferably has a slope 21, sloping downward from the corner 21a defined by sloping backrest 20 and an adjacent edge of interior footprint 15e of bottom base wall 15f, downwards towards water drain hole 22.

In the cantilevered apron deck embodiment of FIGS. 3-9, the front apron deck 16's width of up to a maximum of 3.5 inches is maintained within normal construction requirements to support the sliding glass door tracks, but without the need for limiting interior bathtub volume with thick walls. The cantilevered apron deck 16 can also have a reduced width of about two and one half inches. The side decks 18 and back deck 17 are limited to the thickness of the tub material. In the embodiment of FIGS. 3-9, the front apron deck 16 has a width which is maintained to industry standards to support sliding shower wall tracks thereon, but it is cantilevered from the front surface of front wall 15a inward and then rejoins the thin inner wall of the front wall 15a where its inwardly preferably curved backwards undersurface wall 16a meets near the top of the inner surface of front wall 15a of bathtub 15, thereby not reducing the interior floor space 15e or the interior air volume 30 by the front deck 16's width. The bathtub 15 therefore maximizes internal bathtub/shower stall space within the predetermined confines of typical residential bathroom bathtub and shower space dimensions.

The bathtub 15 of this invention can be made of steel or plastic resin materials and finished as is common in the industry.

A comparison of the interior floor space and enclosed air volume (to the top edge of all four vertical walls the tub) has been made to compare a prior art tub and a tub of FIGS. 3-9 of this invention of the same external dimensions. A prior art front deck of 4" and a back deck of 3" with side decks of 2" in a 60 inch external length by 30 inch tub of 15" average internal depth was assumed for comparison. The wall thickness of the tub of this invention is assumed to be 1". Both tubs have the angled backrest and straight vertical walls. The increased floor area and air volume in the tub of this invention is due to the 1″ wall thickness and decks (on 3 edges) vs. the decks of the prior art tub which reduce the internal dimensions.

The results of the comparison are as follows:
Interior floor area
prior art 1120 sq. in.
this tub 1419 sq. in., a 27% increase.
Interior air volume
prior art 16790 cubic in.
this tub 20845 cubic in., a 24% increase Additionally, the above calculations were based upon a prior art bathtub with a front deck of 4″ and a back deck of 3″ with side decks of 2″ in a 60 inch external length by 30 inch tub of 15″ average internal depth for comparison. However, since most prior art tubs have sloping and bottom rounded sides, the numbers of this estimate represent the minimum percentage increases in interior floor area and interior volume. It is estimated that in comparison with other prior art bathtubs, with increased sloping and bottom rounded sides, the savings can be up to approximately 35% increase in interior floor area and interior air volume.

Bathtub 15 of this invention also offers safety improvement over that of the prior art. Safety studies indicate over 234,000 bathroom injuries each year, of which 81 percent occurred because of falls in the bathroom. Of these injuries, more than one third happen while bathing or showing. The Center for Disease Controls (CDC) estimates that 9.8 percent of all bathroom injuries specifically occur when getting out of a bathtub, which equals at least 22,932 injuries.

Figure 1A:
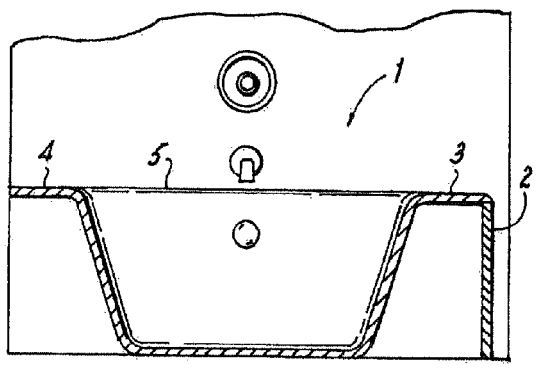
FIG. 1A is a cross-sectional view of a prior art bathtub with a limited space interior.
Figure 8:
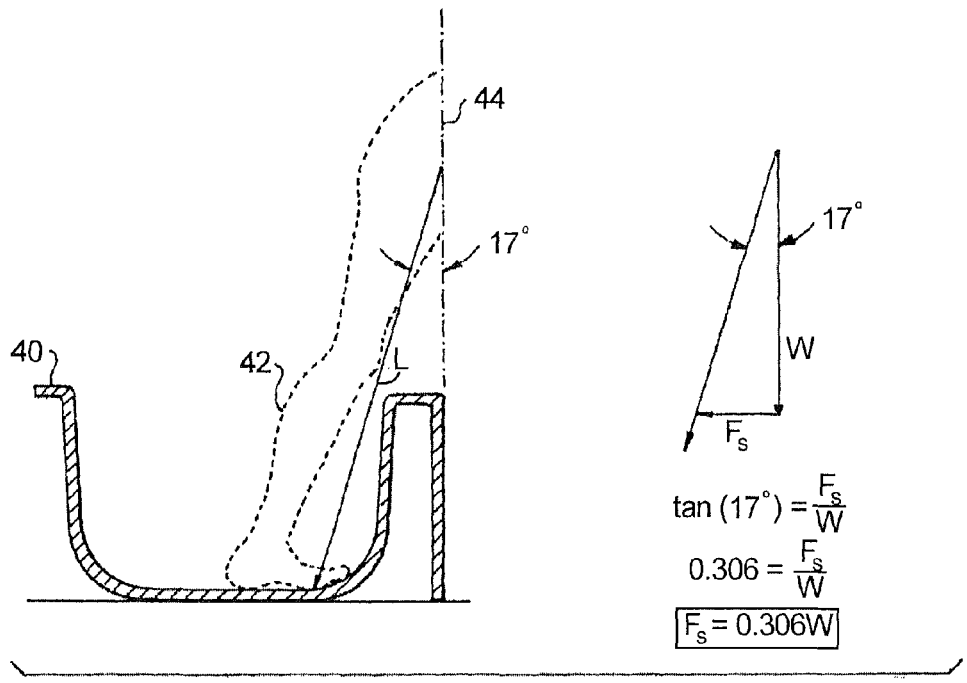
FIG. 8 is an end view profile of a prior art tub with rounded edges at bottom. An outline of the anchor leg of a person in unsupported egress is shown at a particular instant. Also shown is a vector force diagram at the same instant.

FIG. 8 shows a profile of a person 42 exiting a prior art bathtub 40 with rounded walls at the bottom. The "average person" 42 is a composite 50$^{th}$ percentile man or woman with a hip joint to floor dimension L of 35 inches. Although the results of the analysis to follow are somewhat dependent on this selected number, let it be said that a taller person would experience slightly less difference in egress from either a prior art tub or the tub 15 of FIGS. 3-9 of this invention, and vice versa for a shorter person. Note that the rounded side bottom edge forces the anchor foot farther away from the front edge of the tub (toward the middle) to be supported by the flat portion; this is also true of prior art profile shown in FIG. 1A with the sloping sides.

The instant for the static analysis of FIG. 8 is that corresponding to the hip joint being directly above the front edge of the tub with the ball of the anchor foot carrying the entire weight of the person before the forward foot (not shown) touches the ground. For the purpose of analysis, the anchor leg can be represented by a rigid rod from the hip joint 44 to the ball of the anchor foot. By measuring the angle in FIG. 8, it is found that this rod makes a 17 degree angle with the vertical as shown in the vector force diagram to the right. The weight of person 42, W, is shown vertically. The horizontal component force Fs that arises from this arrangement is 0.306 W or almost 31% of the weight of the person. This horizontal component must be resisted by the frictional force between the ball of the anchor foot and the tub (or a tub mat). Several items affect the local coefficient of friction between foot and tub, or foot and mat and mat to tub. Water, and especially soapy water, is a good lubricant and dramatically reduces the coefficient of friction. If the anchor foot slips, the bather is in trouble!

Figure 9:
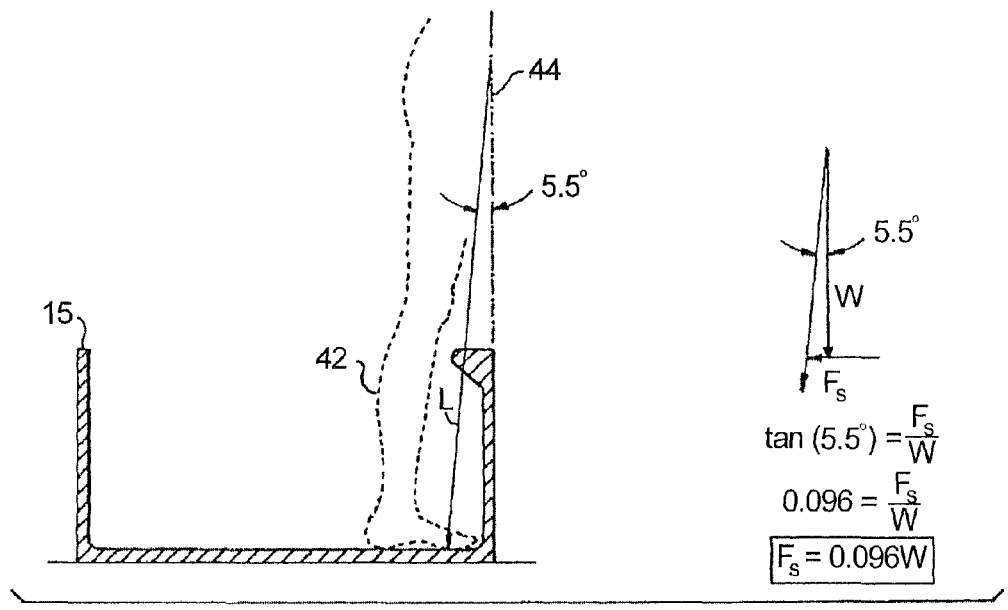
FIG. 9 is an end view profile of the tub of this invention with an outline of the anchor leg of a person in unsupported egress at a comparable instant to that shown in FIG. 8. Also shown is a vector force diagram at the same instant.

If a similar analysis of Applicants' expanded space tub 15 is performed as depicted in FIG. 9, the angle of rigid rod and the vertical is only 5.5 degrees because now the anchor foot is so close to the front edge. The horizontal component force Fs that results in this analysis is 0.096 W or only less than 10% of the weight of the person. Thus with the same bather exiting either a prior art tub or a tub 15, slippage can be avoided in a tub 15 of this invention even if the friction coefficient were ⅓ of that which minimally prevented a spill in a conventional tub. Common sense reinforces the numeric example; the tub 15 side walls are substantially vertical; the bather can have the planted leg being substantially vertical and stable, and this requires only lifting the leading leg up and over the thin apron of 3.5 inches or less.

A non-preferred alternate embodiment tub 50 of this invention is the subject of FIGS. 10-14. This tub is similar to tub 15 of this invention, but uses a front panel of thicker material instead of a top cantilever to provide the top resting surface to receive door tracks (if used).

Figure 10:
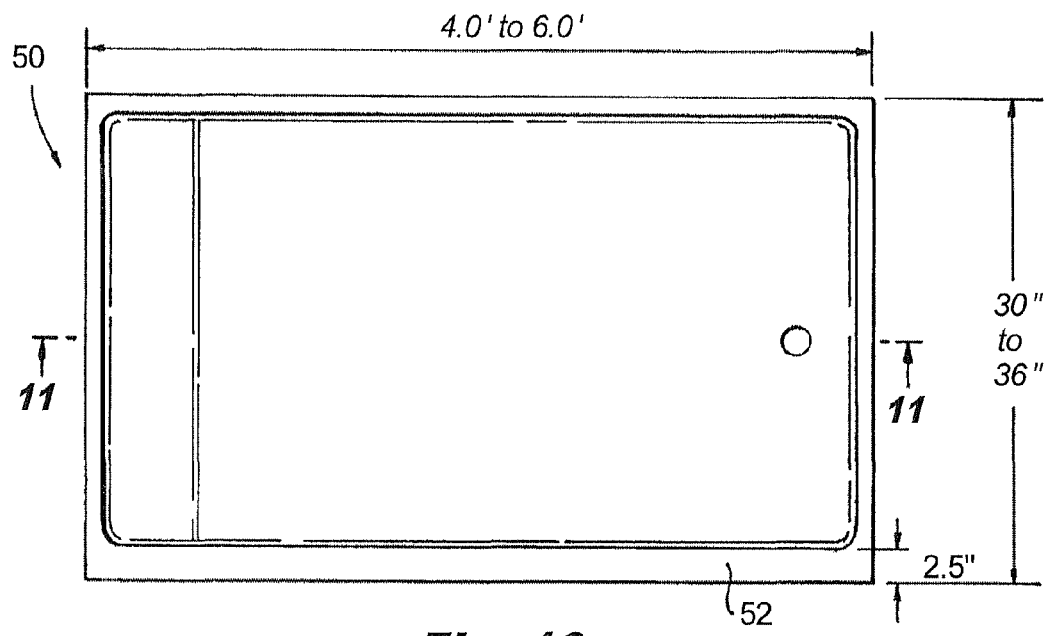
FIG. 10 is a top plan view of an alternate embodiment bathtub of this invention with a thicker front panel (without top cantilever) as shown.
Figure 11:
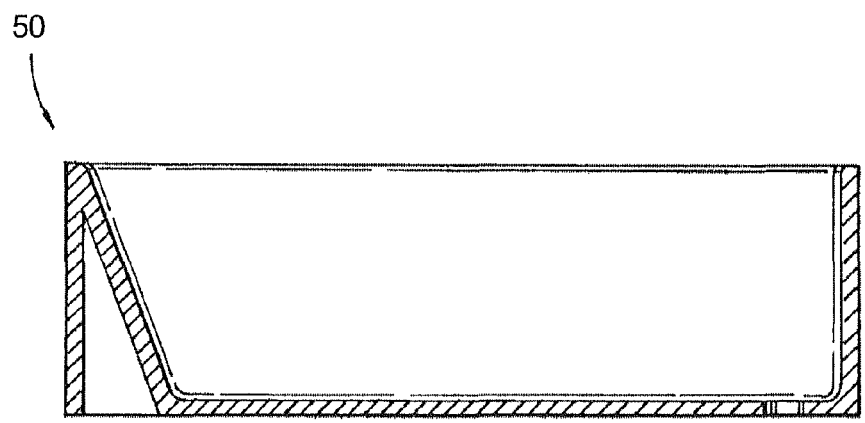
FIG. 11 is a side crossection view of the alternate embodiment of FIG. 10.
Figure 12:
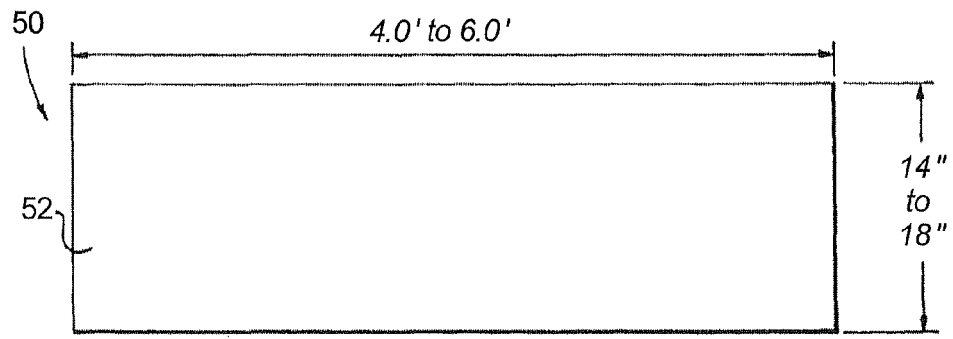
FIG. 12 is a side exterior elevation view of the alternate embodiment.
Figure 13:
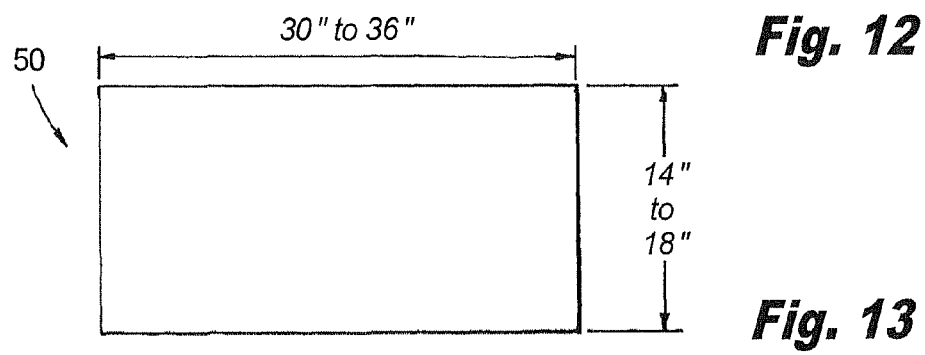
FIG. 13 is an end exterior elevation view of the alternate embodiment.

FIG. 10 is a top view showing a front panel 52 of about 2.5″ in thickness. It is noted that the 2.5″ thickness can be reduced down from 2.5″ in a range of to a top thickness of about one inch. Other dimensions shown in FIGS. 10, 11, 12, and 13 include the length which could be from four to six feet, the height which could be from fourteen to eighteen inches, and the width which could be from thirty to thirty-six inches. The side crossection of FIG. 11 reveals that it is identical in shape to that of FIG. 7 for tub 15.

Figure 14:
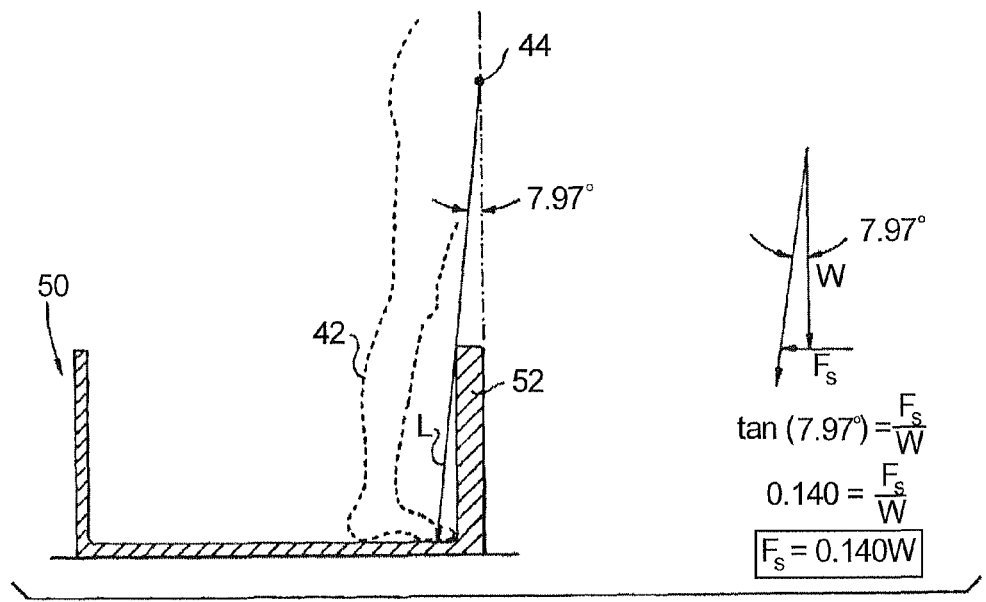
FIG. 14 is an end view profile of the alternate embodiment tub with an outline of the anchor leg of a person in unsupported egress at an instant comparable to that shown in FIGS. 8 and 9. A vector force diagram at the same instant is also shown.

The side profile of FIG. 14 showing the front panel 52 in crossection more clearly shows the distinction from tub 15 with it's cantilever at the top edge (see FIG. 9). FIG. 14 is an egress analysis of person 42 exiting the alternate embodiment tub 50 as was performed before for the prior art, and for tub 15 of this invention. Again, dimension L of a rod from hip joint 44 to the ball of the foot is 35″. In this case however, the rod makes an angle of 7.97 degrees with the vertical as opposed to 17 degrees for the prior art situation or 5.5 degrees for tub 15. In tub 50, person 42's foot is forced slightly back (1.5″) from the front surface relative to the position in tub 15 due to the thicker front panel 52. This geometry results in a side force (Fs) of 14% of the person's weight, W. While this is not as safe as the case for tub 15, this is still less than half the side force of the prior art tub (31% of the person's weight) analysis of FIG. 8.

Figure 18:
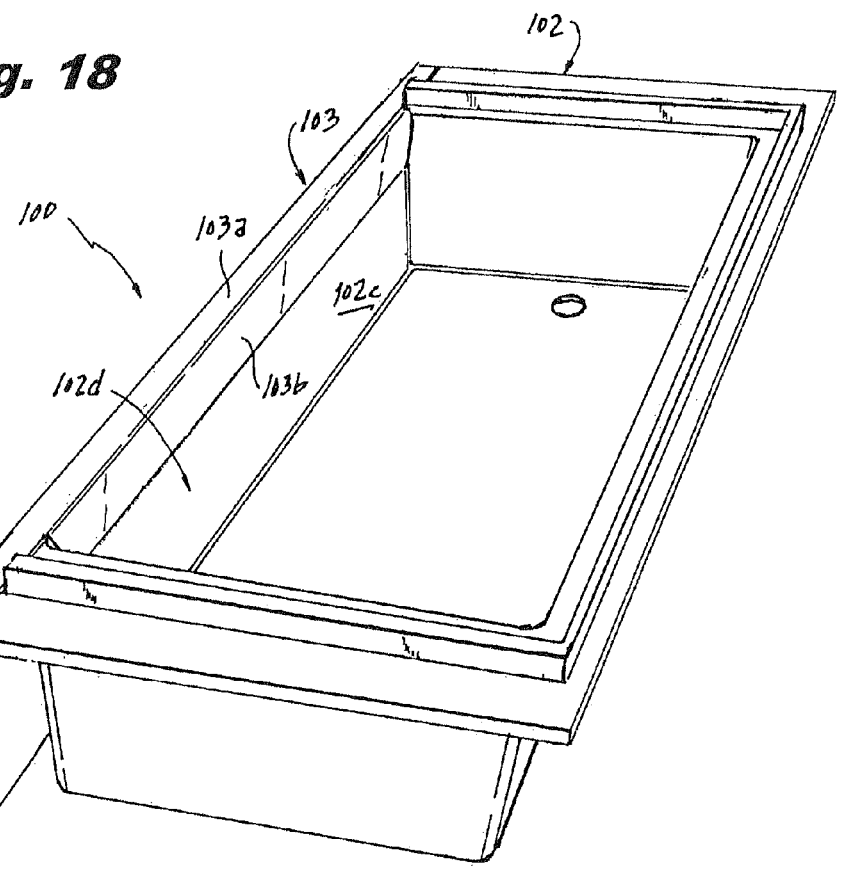
FIG. 18 is a perspective view of the secondary mold piece for the inward ledge having been installed over the primary mold piece for making the bathtub.
Figure 19:
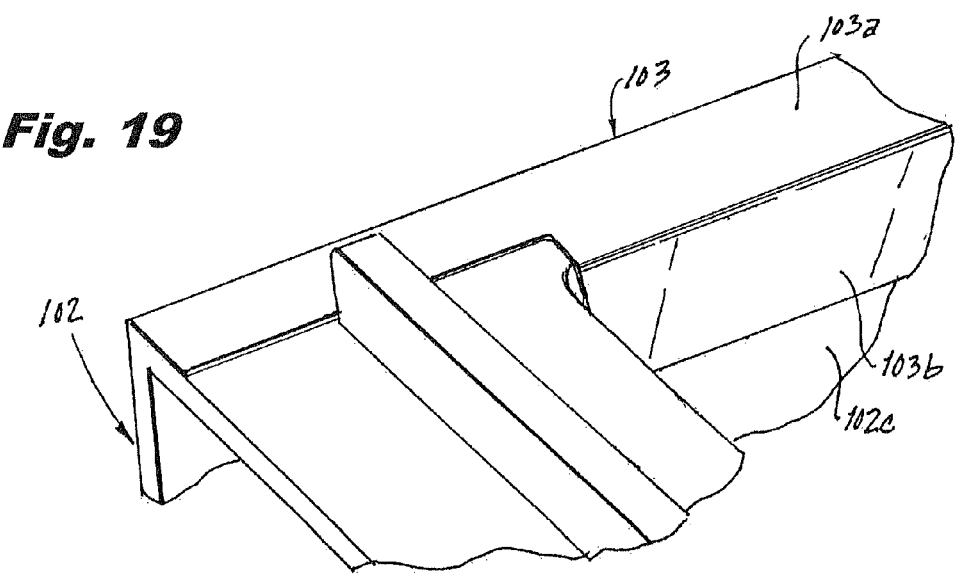
FIG. 19 is a close up perspective detail view of a portion of the secondary mold piece having been installed over the primary mold piece for making the bathtub.
Figure 20:
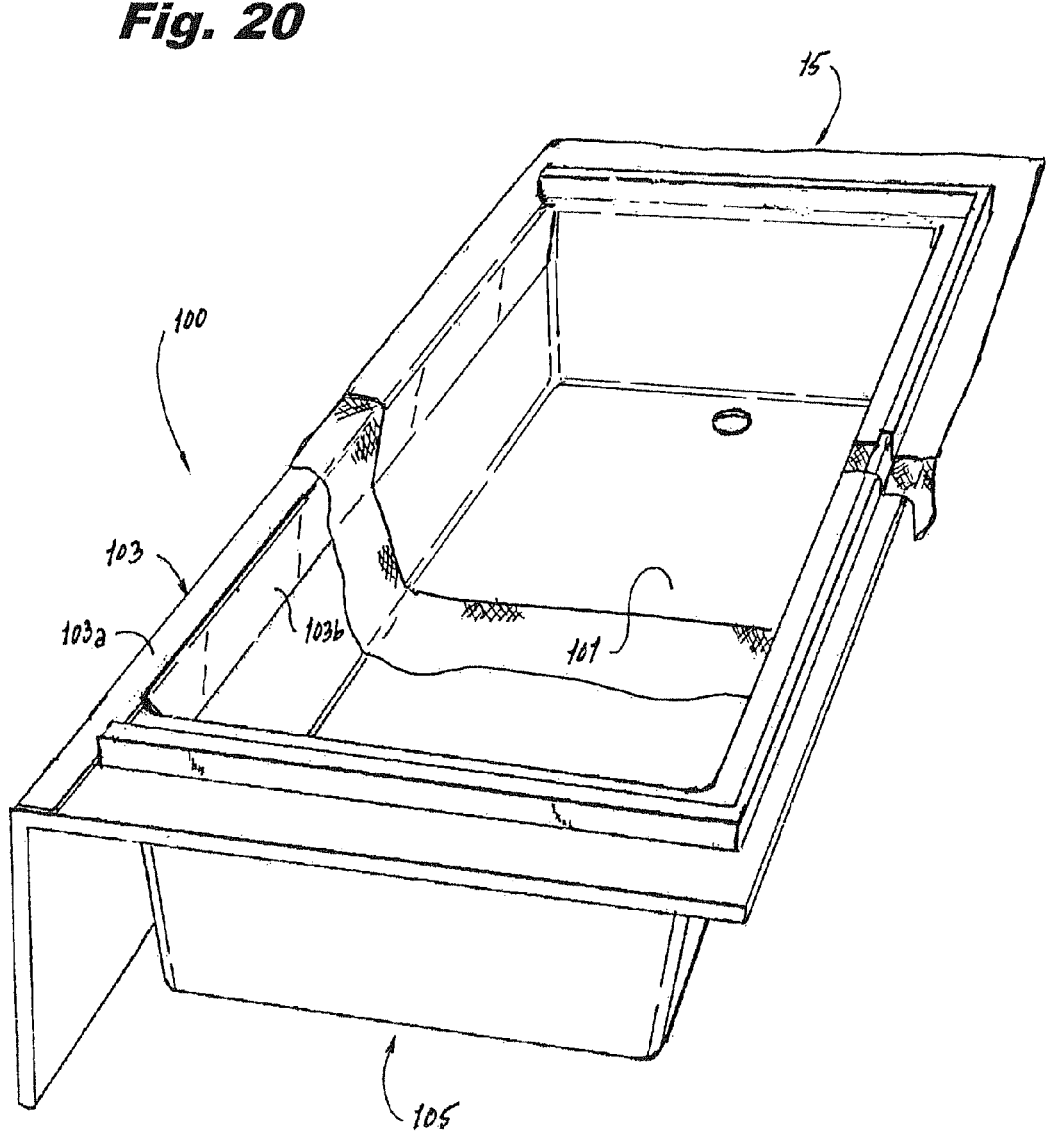
FIG. 20 is a diagrammatic perspective partial crossectional view of a portion of the pourable acrylic material having been poured over a fiberglass sheet laid over a portion of the assembled primary and secondary mold pieces of the two piece mold, used to form the bathtub, with the acrylic material shown sectioned within one portion of one half of the mold, so it can be appreciated how the poured acrylic material conforms to the surfaces of the mold.

FIGS. 15 to 22 show the method of making the bathtub 15 of FIGS. 1-9, with the inwardly extending apron deck ledge 16, by using a two-piece mold 100, so that after the acrylic material 101 is poured into the primary mold piece 102 and set, then the primary mold piece 102 is inverted and the completed bathtub 15 falls easily out of the primary mold piece 102 having hollow tub-shaped portion 105, shown in FIG. 20. The two piece mold is necessary because of the undercut of the inwardly cantilevered apron deck 16.

Figure 17:
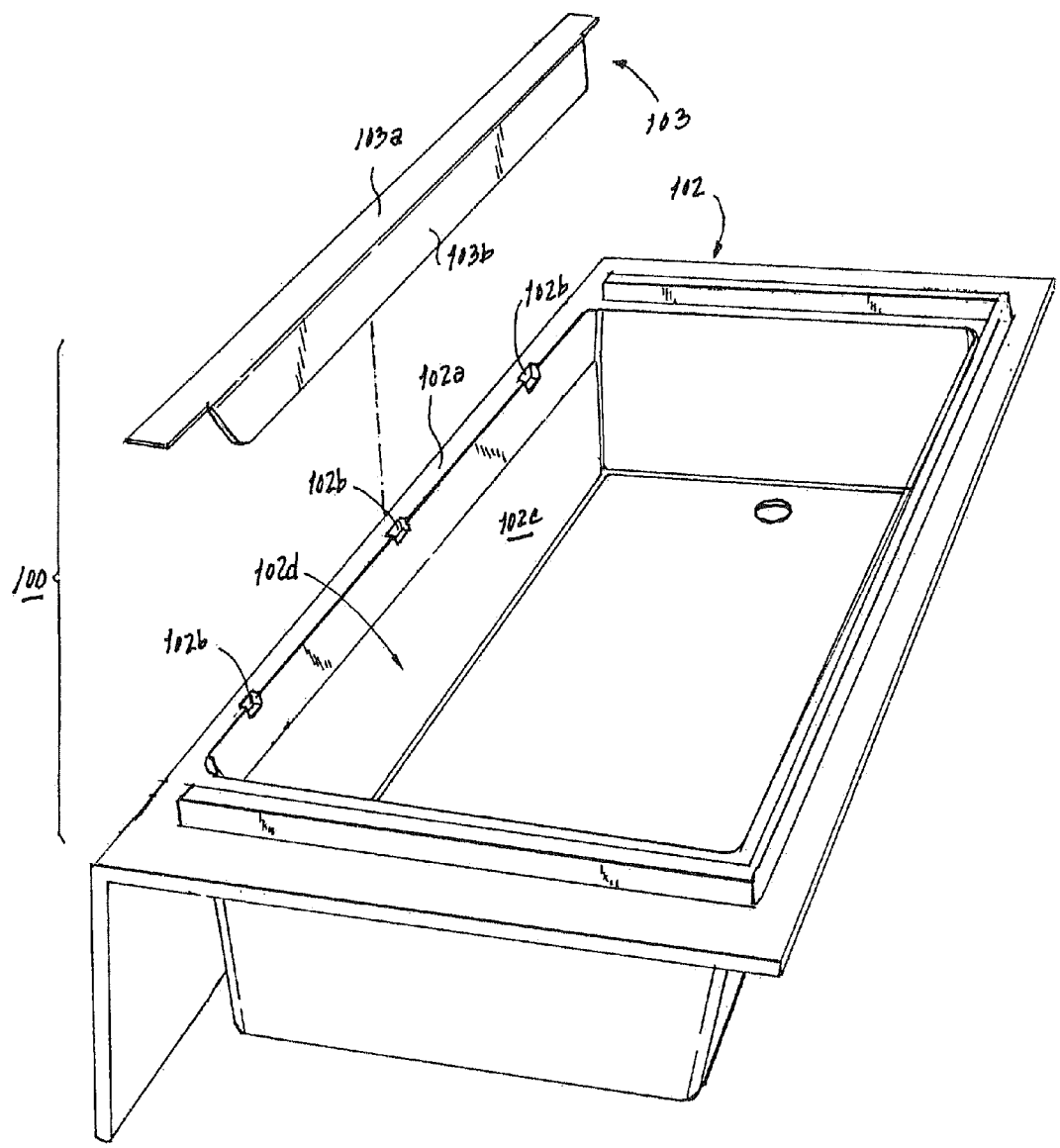
FIG. 17 is an exploded perspective view of the secondary mold piece used to form the cantilevered, inwardly extending apron deck, and wherein the secondary mold piece is shown being installed over the mounting ledge of the primary mold piece for the bathtub.
Figure 21:
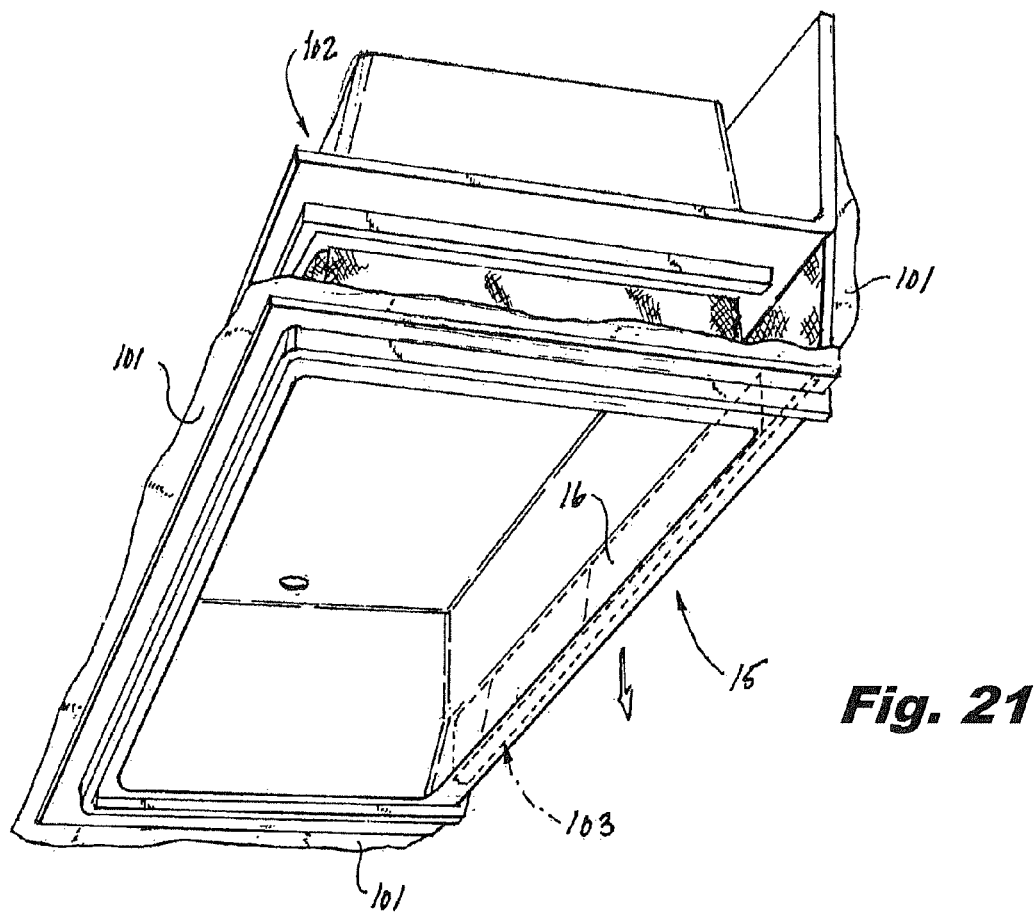
FIG. 21 is an inverted side perspective view of the downward release of the assembled acrylic bathtub with the cantilevered, inwardly extending apron deck, down from the inverted primary mold piece, showing the now formed acrylic bathtub being dropping out partially therefrom, and wherein the secondary mold piece is embedded under the newly formed acrylic cantilevered apron deck.

For example, the cantilevered slanted inward ledge apron deck 16 has to be made of a separate secondary mold piece 103, which is attached to the bathtub 15 as shown in the drawing FIGS. 17-19. Then the acrylic material 101 is poured over a fiberglass layer laid over the two mold pieces 102, 103 as in FIG. 20 and then the main tub mold piece 102 is inverted as in FIG. 21, so that, upon subsequent completion of the mold making of the bathtub 15, the assembled acrylic bathtub 15 will slide downward out of the primary mold piece 102. The smaller secondary inward ledge mold 103 for the inwardly, cantilevered apron deck 16 is then encased within the portion of the tub 15 being the inwardly extending ledge apron deck 16. FIG. 21 also shows excess acrylic material which is trimmed to form the final bathtub 15.

As shown in drawing FIG. 22, of the completed white acrylic tub 15, which is shown inverted after removal as in FIG. 21, the encased secondary mold piece 103 is slid out laterally, in the direction of the arrow shown, from within and below the actual integrally formed inward ledge cantilevered apron deck portion 16 of the bathtub 15.

Figure 22:
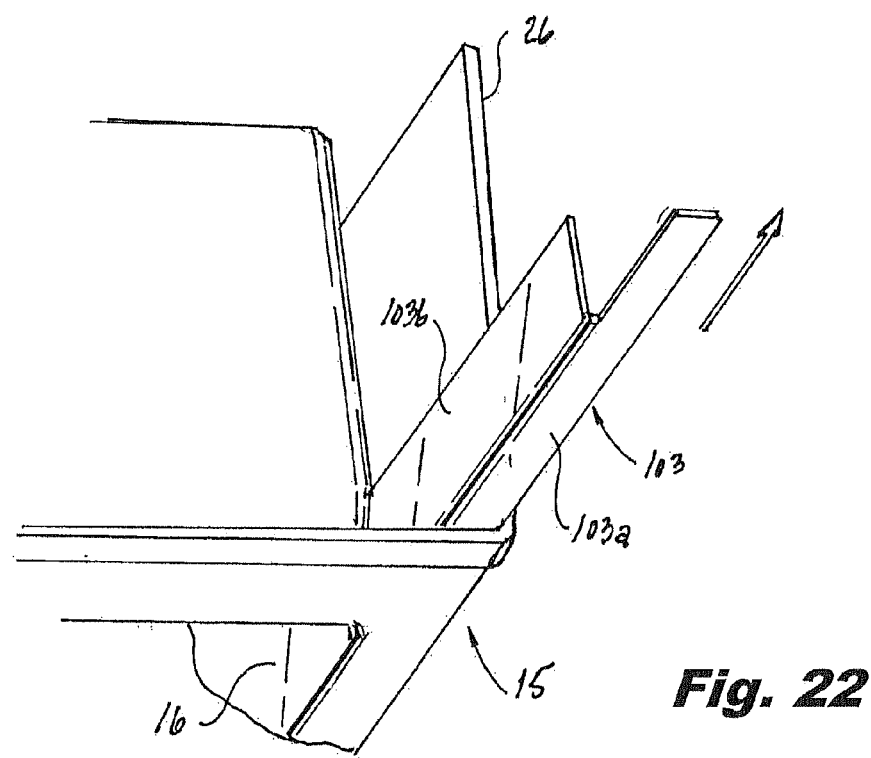
FIG. 22 is an inverted close-up perspective detail view of a portion of the assembled bathtub, having been dropped by gravity from the inverted primary mold piece, with an arrow indicating the lateral sideways pull out directional movement of the removal of the secondary mold piece from beneath the assembled, inwardly cantilevered apron deck portion of the assembled acrylic bathtub.

It is further noted that FIG. 22 shows the upside down inverted bathtub 15, so that the lower right corner of bathtub 15 in FIG. 22 is actually the upper front apron deck 26, when the completed bathtub 15 is turned right side up.

Figure 15:
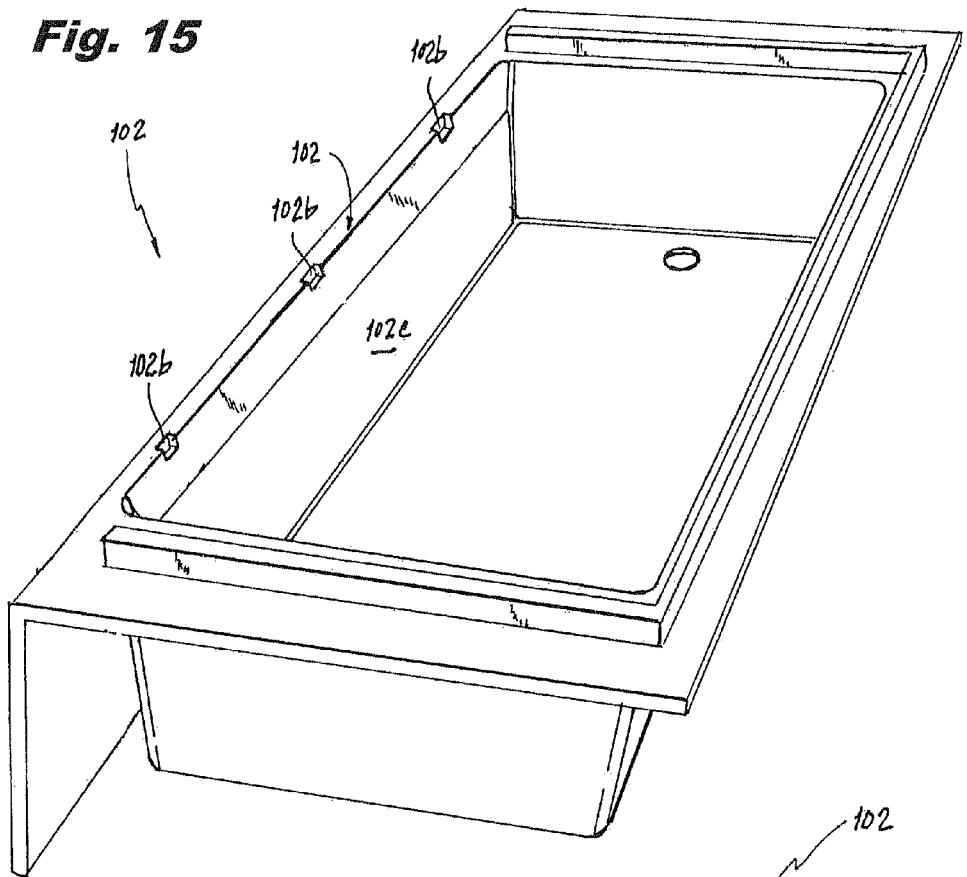
FIG. 15 is a perspective view of the primary mold piece of a two piece mold used to form that bathtub of the present invention with a cantilevered, inwardly extending apron deck with an undercut.
Figure 16:
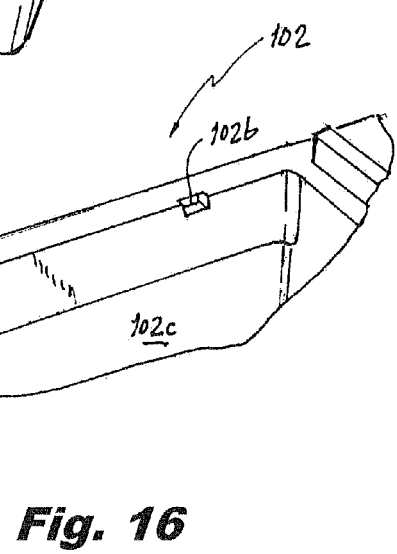
FIG. 16 is a close up view of a top portion of the front wall of the primary mold piece of FIG. 15, showing a mounting ledge with holes for temporarily attaching a secondary mold piece to the primary mold piece, for making the cantilevered, inwardly extending apron deck of the bathtub, and showing in partial cutaway the long edge of the secondary mold piece, showing the holes.

FIGS. 15 and 16 show that the primary mold piece 102 is an analog mirror image of the walls of the bathtub 15, without the cantilevered apron deck 16. A stepped ledge 102a with cut-out holes 102b is provided for protruding nibs (not shown), to anchor and steady the secondary mold piece 103 in place therein, for positioning of the molding of the cantilevered apron deck 16 with an undercut.

FIGS. 17-19 show the angled secondary mold piece 103 with substantially horizontal top ledge 103a and angled undercut slanted surface 103b, which has a bottom edge, which meets the inside 102c of the front wall 102d of the primary mold piece 102.

FIG. 20 shows the acrylic mold material 101 being poured over the flexible fiberglass sheet covering the assembled two piece mold 102, 103.

FIG. 21 shows the inverted bathtub 15 being dropped out of the primary mold piece 102, while the secondary mold piece 103 (shown in phantom) is captured under the cantilevered apron deck 16, and laterally or otherwise removed as in FIG. 22 in the direction of the arrow.

It is further noted that the slanted undersurface of the inwardly extending cantilevered apron deck can assume various configurations. For example, the sloping undercut surface of the apron deck can have variable angles, such as, for example, the undersurface 16a descending from a shoulder, at a wide angle. Alternatively, the slanted undersurface can be longer and have less of an inwardly extending angle, such as would be formed by acrylic poured over undercut slanted surface 103b of a secondary mold piece, shown in FIGS. 17-19. Moreover, the slanted undercut surface can be straight, curved or combinations thereof.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A method of manufacturing a bathtub having an inwardly extending apron deck ledge, comprising the steps of:
    providing a two piece mold, including a primary mold piece for making a hollow, substantially rectangular bathtub and a secondary mold piece for making an inwardly, cantilevered apron deck positioned upon a top of a front wall portion of the bathtub;
    providing said secondary mold piece in a locational position upon, and extending inward therefrom, said top front edge of said primary mold piece;
    pouring acrylic material over the assembled two mold pieces to form the bathtub as an assembled bathtub with said inwardly, cantilevered top apron deck, so that the assembled acrylic bathtub slides downward out; and,
    removing said encased secondary mold piece by sliding it out laterally at from within said integrally formed cantilevered apron deck portion of the bathtub.

2. The method of making a bathtub as in claim 1, wherein said assembled bathtub includes:
    substantially vertical back and front walls, first and second end walls, and a bottom wall, all of said walls being of rigid material, entry and egress of a user being over said front wall;
    said front wall having a top horizontal apron deck extending from an outer surface of said front wall toward said back wall, said top horizontal deck having sufficient width to support sliding shower wall tracks thereon;
    said bottom wall extending to a rear, vertical surface of said front wall with said apron deck extending over said front wall extending down to an area of said bottom wall adjacent said rear, vertical surface of said front wall; and
    whereby a foot extending from a leg of a user on said bottom wall while said user is egressing said bathtub extends adjacent to said rear, vertical surface of said front wall, under said overhanging area so that a straddling angle the leg of the user makes with said front wall is sufficiently small to minimize a horizontal component of force on said foot for reducing an incidence of slippage on a wet bottom and falling.

3. The method of making a bathtub of claim 2 in which said back wall has a top edge sufficient in thickness to accommodate bottom edges of wall tiles when said back wall abuts or is embedded in a room wall.

4. The method of making a bathtub of claim 3 in which said top edge thickness of said back wall is about a quarter of an inch.

5. The method of making a bathtub of claim 2 in which the thickness of said front wall and the closeness of the location of said front wall to the foot of the leg of the user, under said cantilevered top horizontal apron deck, is such as to reduce the horizontal component of force on said foot to less than about 14% of the weight of the user.

6. The method of making a bathtub of claim 2 in which said top horizontal apron deck has a width of up to a maximum of about 2.5 inches.

7. The method of making a bathtub of claim 2 in which said front wall in contact with said bottom wall is minimally rounded at the intersection thereof.

8. The method of making a bathtub of claim 2 in which said front wall has a thickness of about two and one half inches, and said back wall has a thickness of about one inch.

9. The method of making the bathtub of claim 1 with a limited rectangular footprint and optimized floor space, wherein said front wall and said rear wall are tapered, with said top thickness of about one inch and with a bottom thickness of about one and one quarter inch in thickness; and
    wherein a top surface of said substantially planar apron deck has up to a maximum thickness of two and one half inches, and said apron deck has a slanted undercut portion extending back towards an inside surface of said front wall of said bathtub.

10. The bathtub with a cantilevered inwardly extending front apron deck formed by the method of claim 1.

11. A method of making a safe egress bathtub comprising the steps of:
    assembling said bathtub with a two piece mold comprising of a primary mold piece for making the bathtub and a secondary mold piece for making an inwardly, cantilevered, apron deck on a front portion of the bathtub;
    providing said bathtub with substantially vertical back and front walls, first and second end walls, and a bottom wall, all of said walls being of rigid material, entry and egress of a user being over said front wall;

providing said front wall with a top horizontal apron deck extending from an outer surface of said front wall toward said back wall, said top horizontal deck having sufficient width to support sliding shower wall tracks thereon;

said bottom wall extending to a rear, vertical surface of said front wall with said apron deck extending over said front wall extending down to an area of said bottom wall adjacent said rear, vertical surface of said front wall.

12. The method of making a bathtub of claim 11 in which said back wall has a top edge sufficient in thickness to accommodate bottom edges of wall tiles when said back wall abuts or is embedded in a room wall.

13. The method of making a bathtub of claim 12 in which said top edge thickness of said back wall is about a quarter of an inch.

14. The method of making a bathtub of claim 11 in which the thickness of said front wall and the closeness of the location of said front wall to the foot of the leg of the user, under said cantilevered top horizontal apron deck, is such as to reduce the horizontal component of force on said foot to less than about 14% of the weight of the user.

15. The method of making a bathtub of claim 11 in which said top horizontal apron deck has a width of up to a maximum of about 2.5 inches.

16. The method of making a bathtub of claim 11 in which said front wall in contact with said bottom wall is minimally rounded at the intersection thereof.

17. The method of making a bathtub of claim 11 in which said front wall has a thickness of about two and one half inches, and said back wall has a thickness of about one inch.

18. The method of making the bathtub of claim 11 with a limited rectangular footprint and optimized floor space, wherein said front wall and said rear wall are tapered, with said top thickness of about one inch and with a bottom thickness of about one and one quarter inch in thickness; and wherein a top surface of said substantially planar apron deck has up to a maximum thickness of two and one half inches, and said apron deck has a slanted undercut portion extending back towards an inside surface of said front wall of said bathtub.

19. The bathtub with a cantilevered inwardly extending front apron deck formed by the method of claim 11.

* * * * *